(12) United States Patent
Sasson

(10) Patent No.: US 6,363,055 B1
(45) Date of Patent: *Mar. 26, 2002

(54) CONTROL CHANNEL DETERMINER

(75) Inventor: Roni Sasson, Tel Aviv (IL)

(73) Assignee: D.S.P.C. Technologies Ltd., Petach Tikva (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,308

(22) Filed: Jul. 7, 1997

(30) Foreign Application Priority Data

May 6, 1997 (IL) .................................................. 120789

(51) Int. Cl.[7] .................................................. H04J 3/16
(52) U.S. Cl. ........................ 370/252; 370/337; 370/347
(58) Field of Search .............................. 370/252, 242, 370/247, 345, 347, 348, 349, 350, 442, 443, 458, 459, 470, 471, 472, 337; 371/31, 67.1, 68.1, 68.2

(56) References Cited

U.S. PATENT DOCUMENTS

| | | | |
|---|---|---|---|
| 4,768,192 A | 8/1988 | Pattavina et al. | 370/100 |
| 4,791,652 A | 12/1988 | McEachern et al. | 375/111 |
| 5,321,727 A | 6/1994 | Bonnet et al. | 375/100 |
| 5,603,081 A | * 2/1997 | Raith et al. | 455/33.1 |
| 5,604,744 A | * 2/1997 | Andersson et al. | 370/347 |
| 5,606,548 A | 2/1997 | Vayrynen et al. | 370/252 |
| 5,722,078 A | * 2/1998 | Przelomiec et al. | 455/452 |
| 5,768,276 A | * 6/1998 | Diachina et al. | 370/432 |
| 5,778,316 A | * 7/1998 | Persson et al. | 455/434 |
| 5,901,160 A | * 5/1999 | Abe et al. | 371/41 |

FOREIGN PATENT DOCUMENTS

| | | |
|---|---|---|
| EP | 454246 | 8/1995 |
| WO | WO 9715164 | 4/1997 |
| WO | WO 9715166 | 4/1997 |

* cited by examiner

Primary Examiner—Ricky Ngo
(74) Attorney, Agent, or Firm—Eitan,Pearl, Latzer & Cohen-Zedek

(57) ABSTRACT

A unit for determining whether or not a received channel is a control channel is provided. The unit includes a superframe phase estimator and a state machine. The superframe phase estimator estimates the superframe phase based on elapsed time. The state machine determines the validity and the value of a decoded superframe phase field of a received time slot based on the quality of the decoding and in comparison to the estimated superframe phase. The state machine also initializes the superframe estimator.

11 Claims, 4 Drawing Sheets

CONTROL CHANNEL DETERMINER

FIELD OF THE INVENTION

The present invention relates to cellular telephone systems generally and to such systems which have a digital control channel in particular.

BACKGROUND OF THE INVENTION

Cellular telephone systems are known in the art and come in many flavors, each of which has a plurality of base stations spread out over the area to be serviced. Each base station can handle a multiplicity of mobile telephones (or stations) all communicating at approximately the same time.

The particular structure of the telephone system depends on the telephony standard to which it subscribes. Standards are typically promulgated by the International Telephone Union (ITU). One such standard is known as IS-136 which provides digital traffic and control channels which are organized in a time division multiplex (TDM) format with a slotted frame structure.

The frequency range in time division standards such as the IS-136 standard is divided into physical channels. Half of the physical channels are the allocated to the forward channels, which carry messages from the base station to the mobile station, and the remaining half are allocated to the reverse channels, which carry messages from the mobile station to the base station. As shown in FIG. 1, each physical channel is divided into time slots 10, each of which, in turn, may be dedicated to a different logical channel, to form a TDM frame. In the IS-136 standard, each logical channel can be either a traffic channel, containing the speech of one of the communicating person or modems, or a control channel, containing information regarding the operation of one or more mobile and base station. The slotted frames are further organized into a logical structure comprised of repeating superframes and hyperframes as described in more detail hereinbelow.

FIG. 1 illustrates the slot formats 12 and 14, respectively for the control and traffic channels in the forward, base to mobile station, direction. As can be seen, the formats are different, although not significantly so. Each format begins with a 28 bit synchronization field (SYNC) followed thereby with six other fields. The third and fifth fields are each 130 bits long and are filled with the data to be transmitted. The fourth field is 12 bits long and is encoded in both formats. In the control channel 12, it contains a coded "SuperFrame" Phase (CSFP) value, described in more detail hereinbelow. In the traffic channel, the fourth field contains a coded Digital Verification Code (CDVCC) and the sixth field contains a coded Digital control channel Locator (CDL). The latter indicates in which channel, or time slot, the control channel is to be found.

Thus, determining the fourth field type indicates the type of channel. Furthermore, if it is a traffic channel, then the CDL value provides the channel on which to find the control channel. Since both values are encoded with the same Cyclic Redundancy Code (CRC) encoding technique and since the parity bits of the CSFP are inverted, decoding the fourth field should indicate which type of value was present. For example, if the mobile station first assumes that the field was the CDVCC field and the CRC decoding indicates an error, the mobile station can then invert the parity bits and decode the value to produce the CSFP. In many cases, the changed assumption will be correct, indicating the type of channel contained in the current time slot of interest. U.S. Pat. No. 5,606,548 discusses the above-described search method.

Unfortunately, the bits of a field might be received incorrectly. The decoding method of the DVCC or the SFP can correct one incorrectly received bit if the type of the field is known; however, if more than one bit is incorrect, the decoded field will have an incorrect value. If the type of the field is unknown, it must be assumed during the decoding. If the field bits were received correctly, the right assumption yields no error in the decoding and the type of field will be recognized. Nevertheless, if one or more bit was received incorrectly, a wrong assumption might lead to a wrong conclusion about the field type and value.

SUMMARY OF THE INVENTION

An object of the present invention is to provide a further, non-CRC check on the decoded superframe phase value thereby to ensure that the decoded value is a superframe phase and not an incorrectly received digital verification code.

There is therefore provided, in accordance with a preferred embodiment of the present invention, a unit for determining whether or not a received channel is a control channel. The unit includes a superframe phase estimator and a state machine. The superframe phase estimator estimates the superframe phase based on elapsed time. The state machine determines the validity and the value of a decoded superframe phase field of a received time slot based on the quality of the decoding and in comparison to the estimated superframe phase. The state machine also initializes the superframe estimator.

Moreover, in accordance with a preferred embodiment of the present invention, the superframe phase estimator is a counter which increments by a predetermined amount every time slot during active operation and by the amount of time slots lapsed during a sleep period.

Finally, in accordance with a preferred embodiment of the present invention, the state machine includes an initial, non-valid state, a between state and a valid state. The initial state is achieved upon synchronization to a new channel or if the superframe phase field has not matched an estimated superframe phase value for a predetermined number N1 of time slots. The between state is achieved after being in the initial state if the superframe phase field has been correctly received for a predetermined number N2 of time slots or upon return from a short sleep not requiring synchronization to a new channel. The valid state is achieved after being in the between state when the superframe phase field has been equal to the estimated superframe value for a predetermined number N3 of times and only in this state is sleep allowed. The state machine moves from the valid state to the between state or from the between state to the initial state if the superframe phase field has not matched the estimated superframe value for predetermined numbers N4 and N5 of time slots, respectively.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 2:
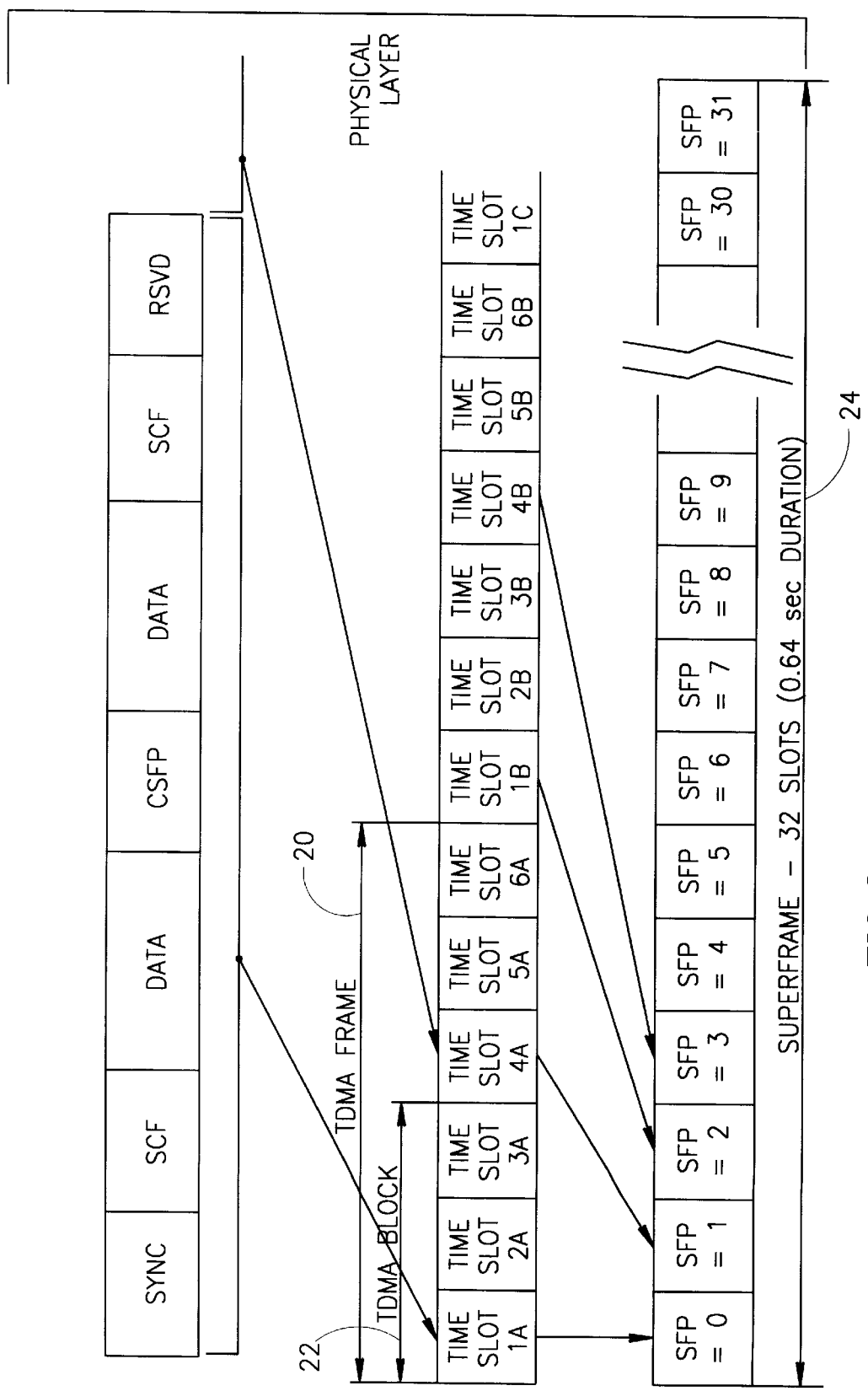
FIG. 2 is a schematic illustration of the structure of a prior art superframe.

The present invention utilizes the superframe phase (SFP) to provide a further, non-CRC check on the decoded SFP value. As shown in FIG. 2 to which reference is now made, each TDMA frame 20 is divided into six time slots 1–6 which are combined into two TDMA blocks 22 of three slots each. Thus, each TDMA block 22 carries three channels where the channels can be either half rate or full rate. Each full rate channel has two time slots per TDMA frame and each half rate channel has one time slot per TDMA frame.

For each control channel, the time slots are combined together into a "superframe" 24 which typically includes 32 time slots for a full rate channel or 16 slots for a half rate channel. The place of a given time slot within the superframe 24 is known as its "phase" and it is this value (from 0 to 31) which becomes the SFP value. FIG. 2 shows the time slots labeled A, B and C for three consecutive TDMA frames 20 and shows an exemplary superframe for the first channel where time slot 1A has superframe phase 0, time slot 4A has superframe phase 1, time slot 1B has superframe phase 2, etc.

Thus, as Applicant has realized, the superframe phase value provides information regarding channel type in addition to that provided by the CRC error flag. The present invention tracks the superframe phase as a further check on the decoded superframe phase value.

Figure 3:
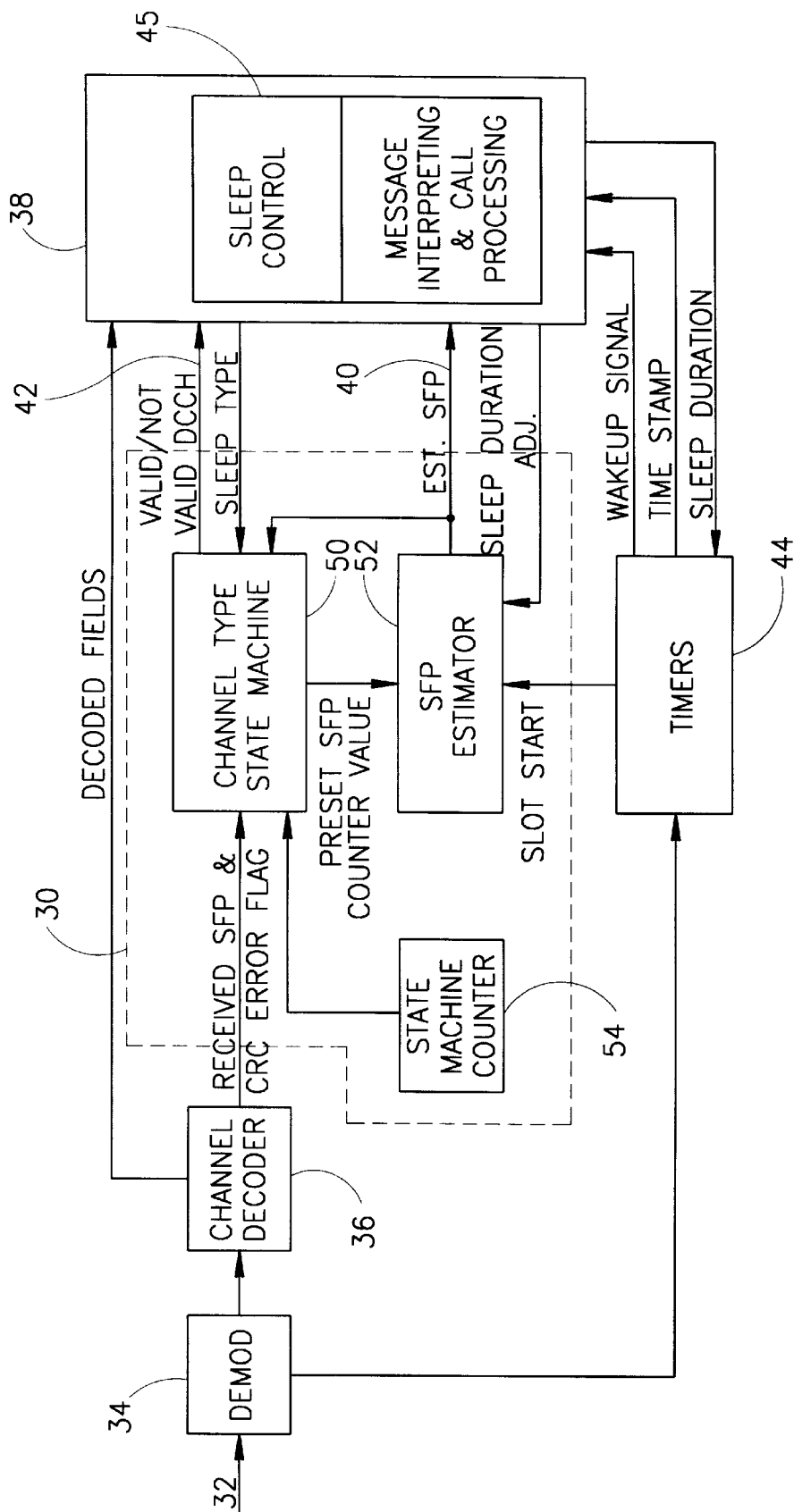
FIG. 3 is a block diagram illustration of a control channel determiner within receiver elements of a mobile station, constructed and operative in accordance with a preferred embodiment of the present invention.

Reference is now made to FIG. 3 which illustrates a control channel determiner 30 and the elements of a receiver portion of a mobile station with which determiner 30 operates. The receiver elements form part of a standard mobile station and will not be described hereinbelow in detail as they are known elements.

A received signal 32 is initially demodulated from a radio frequency (RF) format by demodulator 34. The output of demodulator 34 are the bit values for each of the bits in the current time slot 10. The bit values can be either "hard" (i.e. "1" or "0") or "soft" values (i.e. which have associated therewith the quality of the demodulation), depending on the type of decoder.

Figure 1:
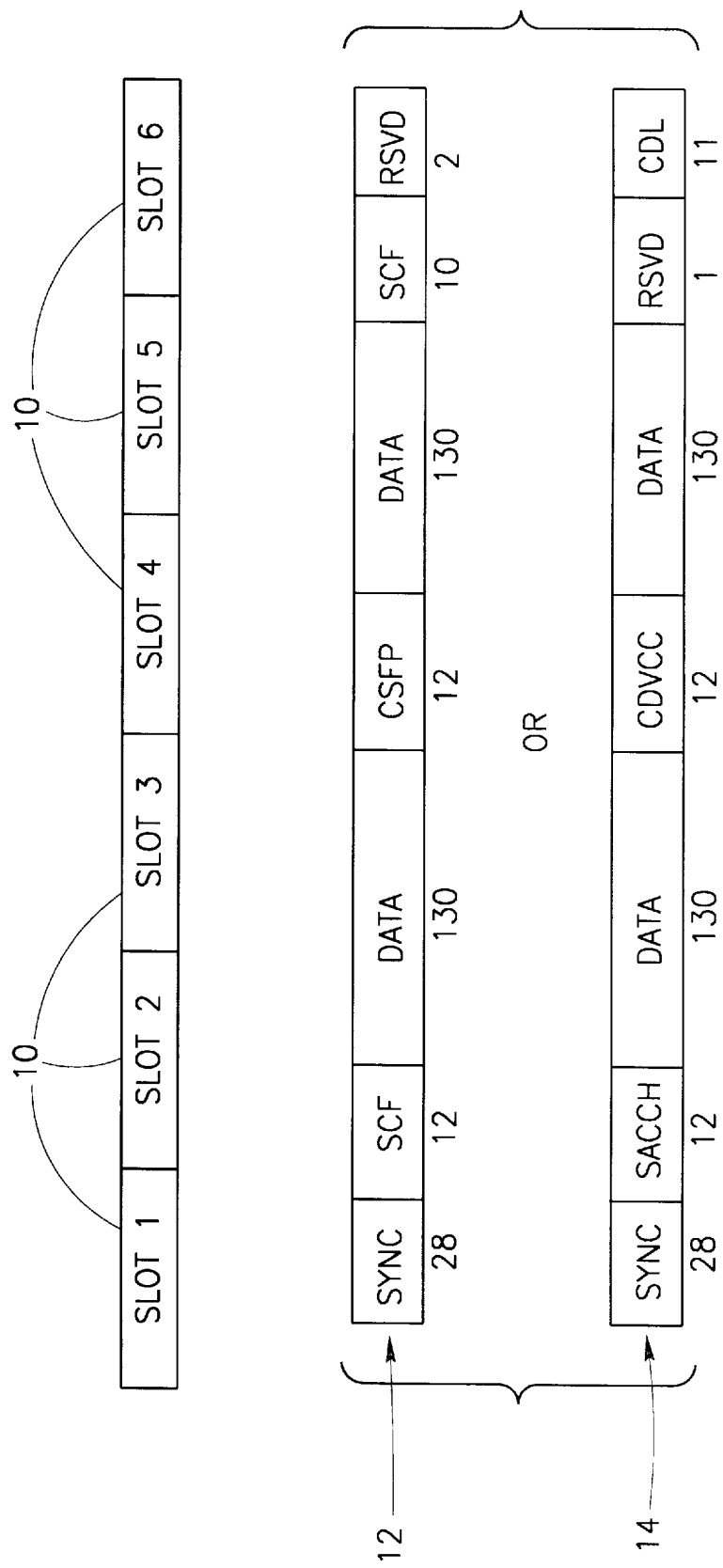
FIG. 1 is schematic illustration of prior art time slots transmitted from a base station to a mobile station.

A channel decoder 36 separates the time slot into its separate fields, decodes the fields (via CRC decoding as discussed hereinabove with respect to FIG. 1 or via other decoding operations) and provides their values to a controller 38 which controls the operations of the mobile station. The decoding operation typically produces an error flag indicating the estimated quality of the decoding.

Channel decoder 36 also provides the decoded superframe phase (SFP) field and the decoder error flag to the control channel determiner 30 which, in turn, estimates the superframe phase 40 and determines if the channel is a control channel 42. This output is provided to the controller 38.

Control channel determiner 30 comprises a channel type state machine 50 (shown in detail in FIG. 4), a superframe phase estimator 52 and a state machine counter 54. Estimator 52 is an initializable counter.

When the time slot data is continual, the superframe phase increases by one for a full rate channel or by two for a half rate channel at each time stamp (the time stamp is provided by timers 44). Thus, when the next time slot is received, estimator 52 increments its count of the superframe phase value by one (full rate) or by two (half rate) and provides the estimated superframe phase value to the state machine 50.

However, if the mobile station has powered down, partially or fully, the superframe phase will have changed since the last time data was received. In accordance with a preferred embodiment of the present invention, superframe estimator 52 uses the sleep duration to estimate the current superframe phase from the previously received superframe phase. The sleep duration is typically determined by a sleep control unit 45 forming part of controller 38. Sleep control unit 45 defines two types of sleeps, a long sleep after which resynchronization is required and a short sleep which does not require resynchronization. A short sleep may be defined as a period during which the timing is sufficiently accurate to enable the symbol data to be reconstructed from the channel, thereby avoiding the need for resynchronization. The threshold time is dependent on the ability of the receiver to identify the start of a time slot without having recently received a time slot.

If the mobile station has been asleep for some time, the estimator 52 increases its count by the number of time slots during which the mobile station was powered down.

The state machine 50 compares the estimated superframe phase value with the received one for one or more time slots and determines a) if the field is a valid superframe phase value and b) if the channel is a control channel.

Figure 4:
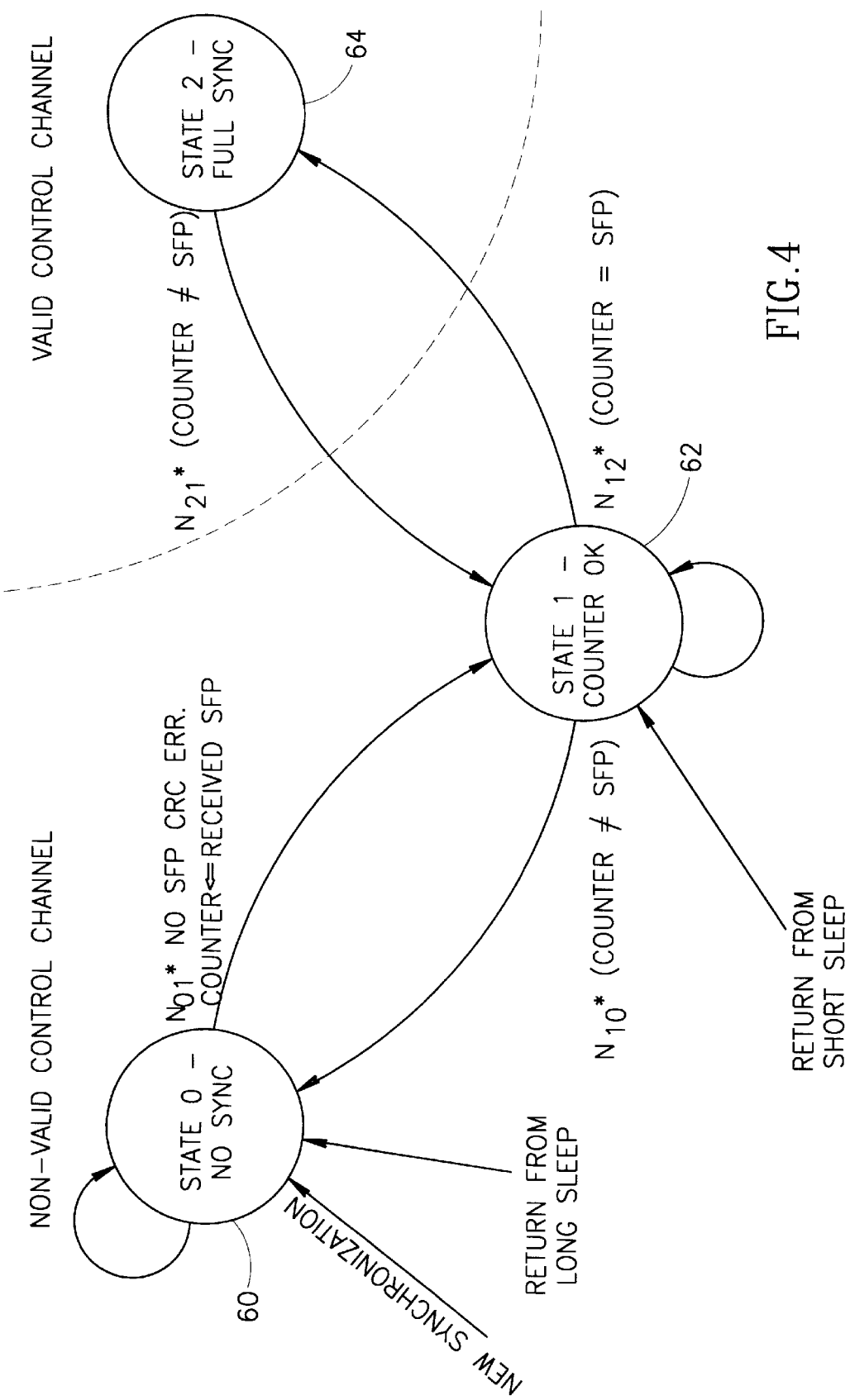
FIG. 4 is an illustration of a state machine forming part of the control channel determiner of FIG. 3.

As shown in FIG. 4, the state machine 50 has three states 60, 62 and 64 where only state 64 indicates a valid control channel (i.e. the mobile station is synchronized to the control channel). State 60 indicates that the channel is not likely to be a control channel or that its superframe phase is not yet acquired and state 62 is the between state.

Specifically, the state machine 50 starts in state 60 whenever the mobile station has synchronized to a new channel or to a new time slot and moves out of it to state 62 only when there has been no decoding error, as indicated by the decoder error flag, for $N_{01}$ time slots. The definition of decoding error can be either only when the error is uncorrectable or any error, correctable or uncorrectable.

A typical value of $N_{01}$ is 3. State machine counter 54 counts to $No_1$ by increasing an internal counter when a time slot has no decoding error. However, when the time slot has a decoding error, state machine counter 54 either decreases the counter (until it reaches 0) or resets the counter to 0. For both embodiments, the stored value is compared to $N_{01}$ at each time slot and state machine 50 moves to state 62 only when the internal value is equal to $N_{01}$. At this point, the internal counter is reinitialized to 0.

When the state machine 50 moves to state 62, the state machine 50 initializes superframe phase estimator 52 (called "COUNTER" in FIG. 4) with the decoded superframe phase value. The state machine 50 then receives the decoded superframe phase field for the next time slot.

The state machine 50 returns to state 60 either upon waking from a long sleep, as determined by sleep control 45, or when the received superframe phase field has not matched the estimated superframe phase value stored in COUNTER for $N_{10}$ time slots. $N_{10}$ has a typical value of 2 which is counted by the state machine counter 54. The count is increased when a time slot has no match and either decreased down to 0 or reset to 0 when there is a match.

The state machine 50 also moves to state 62 after a short sleep, as determined by sleep control 45. The state machine 50 moves from state 62 to state 64 (i.e. a valid control channel is declared) when the received superframe phase field has had the same value as the estimated one, stored in COUNTER, for $N_{12}$ time slots, where $N_{12}$ typically has a value of 1 and is counted by state machine counter 54. The value of state machine counter 54 is increased when a time slot has a match and is decreased until 0 or reset to 0 when there is no match. As long as the received superframe phase field keeps the same value as the estimated one, the state machine 50 remains in state 64.

The state machine 50 only moves out of state 64 to state 62 whenever the received superframe phase field has not matched the estimated one, stored in COUNTER, for $N_{21}$ time slots, where $N_{21}$ is typically 2. The state machine counter 54 increases an internal counter when a time slot has no match and decreases it or resets it to 0 when there is a match.

It will be appreciated that the selection of the various constants N provides some robustness to the state machine 50, ensuring that it changes state only once a significant change has occurred. Furthermore, state machine counter 54 typically has a counter associated with each of the constants N, where the relevant counter is increased, decreased or reset as described hereinabove. The relevant counter is zeroed each time the state machine 50 moves to a new state. However, when the mobile machine returns from a short sleep to state 62, the counter associated with $N_{12}$ is set to $N_{12}-1$.

It will further be appreciated that, at every time slot, the state machine 50 receives the superframe phase field of the current time slot and the estimated superframe phase from the estimator 52 and produces a valid/not valid control channel flag, where the flag is true only for state 64. At each time slot, estimator 52 either increments the value stored therein by one, if there was no sleep, or by the number of time slots during which the mobile station was powered down, thereby to produce the estimated superframe phase.

It will be appreciated by persons skilled in the art that the present invention is not limited by what has been particularly shown and described herein above. Rather the scope of the invention is defined by the claims which follow:

What is claimed is:

1. A state machine comprising:
   a first set of at least one logic device configured to produce an invalid state to indicate that a valid superframe phase field is not present, a second set of at least one logic device configured to produce a between state to indicate that synchronization to a superframe phase field is in progress, and a third set of at least one logic device configured to produce a valid state to indicate that a valid superframe phase field is present, wherein first, second and third sets may overlap.

2. The state machine according to claim 1 and wherein said invalid state is achievable upon synchronization to a new channel or if said superframe phase field has not matched an estimated superframe phase value for a predetermined number N1 of time slots.

3. The state machine according to claim 1, and wherein said between state is achievable after being in said invalid state if said superframe phase field has been correctly received for a predetermined number N2 of time slots or upon return from a short sleep not requiring synchronization to a new channel.

4. The state machine according to claim 2 and wherein said valid state is achievable if said superframe phase field has been equal to said estimated superframe value for a predetermined number N3 of time slots.

5. The state machine according to claim 2 and wherein said state machine moves from said valid state to said between state or from said between state to said invalid state if said superframe phase field has not matched said estimated superframe value for predetermined numbers N4 and N5 of time slots, respectively.

6. Apparatus comprising:
   a superframe phase estimator adapted to estimate the superframe phase based on elapsed time; and
   a state machine having an invalid state, a between state and a valid state wherein
   said invalid state is adapted to indicate that a valid superframe phase field is not present,
   said between state is adapted to indicate that synchronization to a superframe phase field is in progress, and
   said valid state is adapted to indicate that a valid superframe phase field is present.

7. The apparatus according to claim 6, wherein said invalid state is achievable upon synchronization to a new channel or if said superframe phase field has not matched an estimated superframe phase value for a predetermined number N1 of time slots.

8. The apparatus according to claim 6, wherein said between state is achievable after being in said invalid state if said superframe phase field has been correctly received for a predetermined number N2 of time slots or upon return from a short sleep not requiring synchronization to a new channel.

9. The apparatus according to claim 6 and wherein said valid state is achievable if said superframe phase field has been equal to said estimated superframe value for a predetermined number N3 of time slots.

10. The apparatus according to claim 6, wherein said state machine moves from said valid state to said between state or from said between state to said invalid state if said superframe phase field has not matched said estimated superframe value for predetermined numbers N4 and N5 of time slots, respectively.

11. The apparatus according to claim 6 and wherein said superframe phase estimator is a counter which increments by a predetermined amount every time slot during active operation and by the amount of time slots lapsed during a sleep time.

* * * * *